United States Patent
Suzuki et al.

(10) Patent No.: US 8,202,360 B2
(45) Date of Patent: Jun. 19, 2012

(54) METHOD OF PRODUCING AMORPHOUS ALUMINUM SILICATE, AMORPHOUS ALUMINUM SILICATE OBTAINED WITH SAID METHOD, AND ADSORBENT USING THE SAME

(75) Inventors: Masaya Suzuki, Ibaraki (JP); Katsuhiro Tsukimura, Ibaraki (JP); Keiichi Inukai, Aichi (JP); Natsuko Kozuka, Aichi (JP); Masaki Maeda, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 13/060,384

(22) PCT Filed: Sep. 2, 2009

(86) PCT No.: PCT/JP2009/065294
§ 371 (c)(1),
(2), (4) Date: Apr. 18, 2011

(87) PCT Pub. No.: WO2010/026975
PCT Pub. Date: Mar. 11, 2010

(65) Prior Publication Data
US 2011/0189070 A1    Aug. 4, 2011

(30) Foreign Application Priority Data
Sep. 2, 2008 (JP) ................................. 2008-224574

(51) Int. Cl.
C01B 33/26 (2006.01)
B01J 20/16 (2006.01)
F24F 3/14 (2006.01)
B01D 53/28 (2006.01)

(52) U.S. Cl. ...................... 106/483; 423/328.1; 502/263
(58) Field of Classification Search ................... 106/483; 423/328.1; 502/263
See application file for complete search history.

(56) References Cited

U.S. PATENT DOCUMENTS

| 4,152,404 | A | 5/1979 | Farmer |
| 4,959,338 | A | 9/1990 | Miura et al. |
| 6,254,845 | B1 | 7/2001 | Ohashi et al. |
| 7,887,770 | B2 | 2/2011 | Suzuki et al. |
| 2010/0028237 | A1 | 2/2010 | Suzuki et al. |
| 2010/0113265 | A1 * | 5/2010 | Suzuki et al. ................. 502/408 |
| 2010/0320418 | A1 | 12/2010 | Suzuki et al. |

FOREIGN PATENT DOCUMENTS

| JP | 61-257234 | A | 11/1986 |
| JP | 05-170426 | A | 7/1993 |
| JP | 2000-128520 | A | 5/2000 |
| JP | 2001-064010 | A | 3/2001 |
| JP | 2001-220129 | A | 8/2001 |
| JP | 2002-121018 | A | 4/2002 |
| JP | 2003-019435 | A | 1/2003 |
| JP | 2004-059330 | A | 2/2004 |
| JP | 2004-224583 | A | 8/2004 |
| JP | 2004-345892 | A | 12/2004 |
| JP | 2005-040753 | A | 2/2005 |
| JP | 2006-240956 | A | 9/2006 |
| JP | 2008-179534 | A * | 8/2008 |
| WO | 2008/081605 | A1 | 7/2008 |
| WO | 2008/129968 | A1 | 10/2008 |
| WO | 2009/084632 | A1 | 7/2009 |

OTHER PUBLICATIONS

B.A. Goodman et al., "Structural Studies of Imogolite and Allophanes by Aluminum-27 and Silicon-29 Nuclear Magnetic Resonance Spectroscopy", Physics and Chemistry of Minerals, vol. 12, pp. 342-346, 1985 (month unknown).
V.C. Farmer et al., "Synthetic Allophane and Layer-Silicate Formation in SiO2-Al2O3-FeO-Fe2O3-MgO-H2O Systems at 23 degrees C and 89 degrees C in a Calcareous Environment", Clays and Clay Minerals, vol. 39, No. 6, pp. 561-570, 1991 (month unknown).
A. McCutcheon et al., "29Si Labeled Nanoaluminosilicate Imogolite", Journal of Non-Crystalline Solids, vol. 351, pp. 1967-1972, Jun. 23, 2005.
R.V. Sriwardane et al., "Adsorption of CO2, N2, and O2 on Natural Zeolites", Energy & Fuels, vol. 17, pp. 571-576, Mar. 19, 2003.
W.C. Ackerman et al., "Adsorption Studies of Pure and Modified Imogolite as a Potential Pore Size Standard", Studies in Surface Science and Catalysts, vol. 87, pp. 735-744, 1994 (month unknown).
W.C. Ackerman et al., "Gas/Vapor Adsorption in Imogolite: A Microporous Tubular Aluminosilicate", Langmuir, vol. 9, pp. 1051-1057, 1993 (month unknown).

* cited by examiner

Primary Examiner — Anthony J Green
(74) Attorney, Agent, or Firm — Howson & Howson LLP

(57) ABSTRACT

The present invention aims to provide an adsorbent with superior adsorption performance of 20 wt % or more in a humidity range of 5 to 60 wt % by using a low-cost reagent as the raw material. Aluminum sulfate is used as the Al source, the respective aqueous solutions are mixed to achieve a Si/Al molar ratio of 0.70 to 1.0 in the mixed solution, the pH is adjusted to be 6 to 9 with acid or alkali, the solution is heated at 90 to 110° C. and subsequently subject to desalination treatment in order to synthesize an amorphous aluminum silicate. The obtained amorphous aluminum silicate yields a superior water vapor adsorption performance of 20 wt % or more in a relative humidity of 60%, and can be used as an adsorbent for desiccant air conditioning and as other adsorbents.

8 Claims, 4 Drawing Sheets

[Fig. 1]
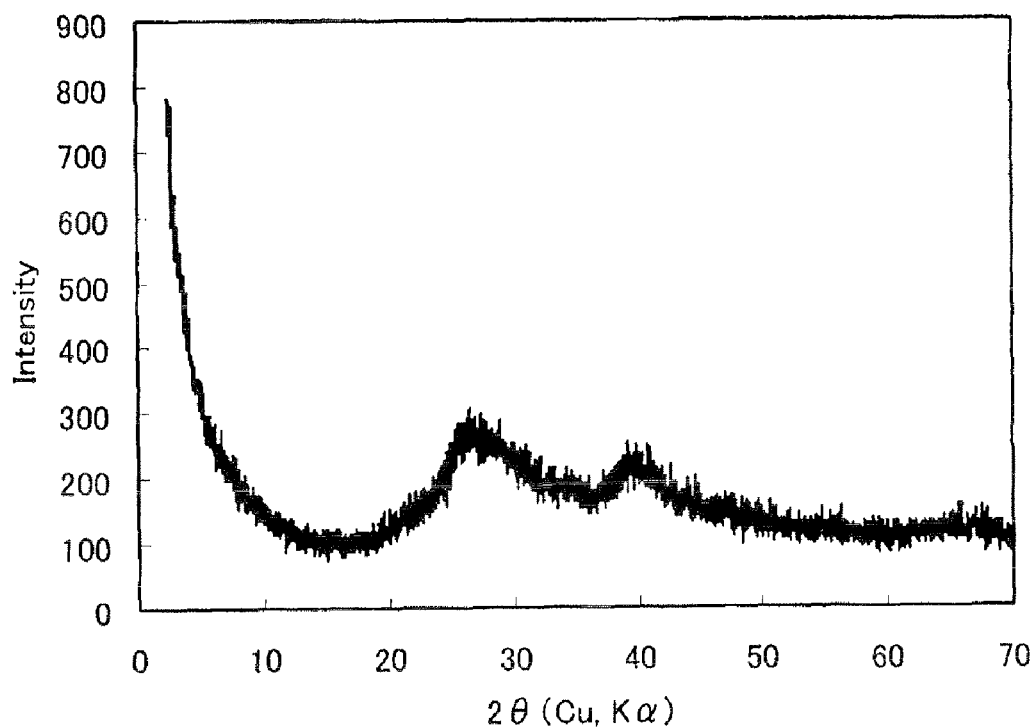
[Fig. 2]
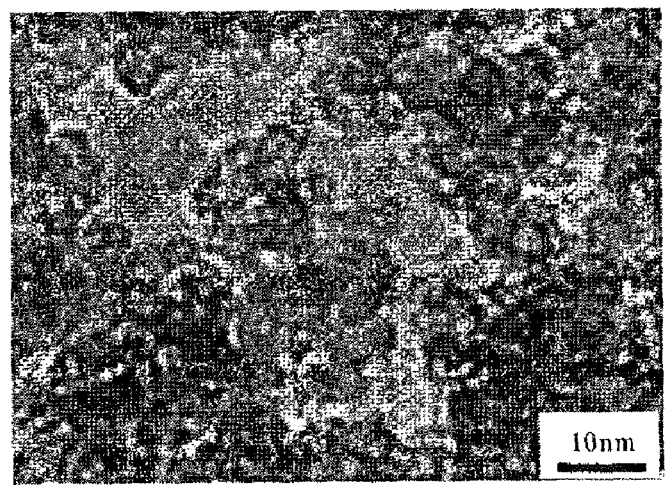

[Fig. 3]
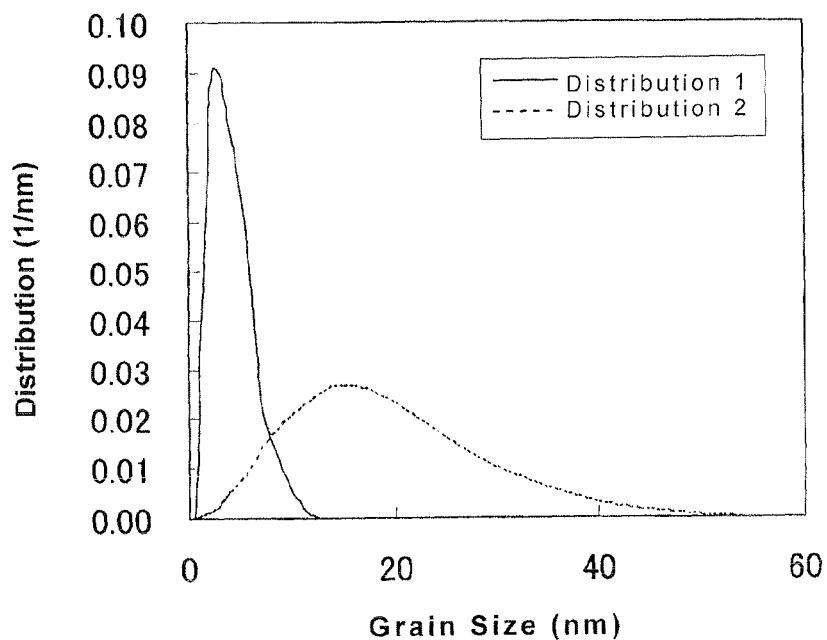
[Fig. 4]
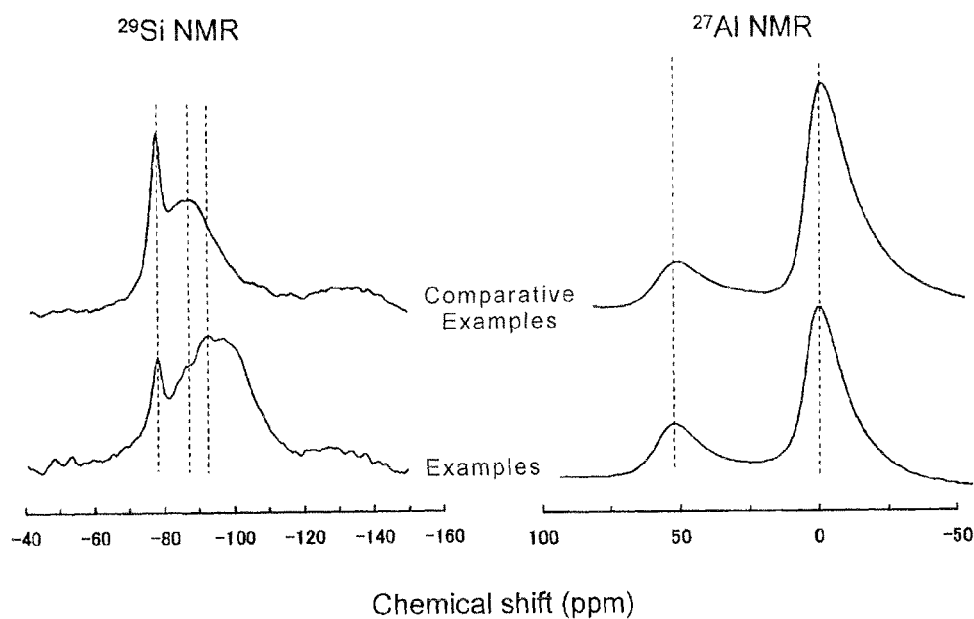

METHOD OF PRODUCING AMORPHOUS ALUMINUM SILICATE, AMORPHOUS ALUMINUM SILICATE OBTAINED WITH SAID METHOD, AND ADSORBENT USING THE SAME

TECHNICAL FIELD

The present invention generally relates to a substance showing superior physicochemical properties such as high-specific surface area, high pore volume, ion-exchange capacity and adsorptive capacity due to a microstructure resulting from its unique shape, of which application as an innovative functional material is expected, in the field of nanotechnology of which practical application is strongly expected as the important fundamental technology that will support the next-generation industry. In particular, the present invention relates to a method of producing amorphous aluminum silicate having superior adsorption and desorption properties of moisture vapor in the medium-humidity range, the amorphous aluminum silicate obtained with the foregoing method, and an adsorbent using such amorphous aluminum silicate.

BACKGROUND ART

A nano-sized tubular aluminum silicate is naturally produced as an imogolite, and an imogolite exists in soil and is primarily produced in soil deriving from volcanic ash. Moreover, a natural imogolite, together with allophane as the related mineral, affects the transfer of nutrients and moisture in the soil and their supply to plants, and also affects the accumulation and residue of hazardous contaminants. The foregoing tubular aluminum silicate has, as its primary constituent elements, silicon (Si), aluminum (Al), oxygen (O) and hydrogen (H), and it is a hydrated aluminum silicate assembled by numerous Si—O—Al bonds, has a tubular shape with an outer diameter of 2.2 to 2.8 nm, an inner diameter of 0.5 to 1.2 nm and a length of 10 nm to several μm, and is a clay constituent naturally distributed in the soil having, as its base material, the deposited volcanic ejecta such as volcanic ash and pumice.

A protoimogolite is a precursor substance of the imogolite, and becomes an imogolite by heating the precursor dispersed in an aqueous solution at approximately 100° C. Thus, the precursor substance before heating and during the process of forming the imogolite is referred to as a protoimogolite. Since a protoimogolite has properties that derive from the imogolite structure, it shows the same peak as imogolite at −78 ppm in a $^{29}$Si solid state NMR, and the silicon has a coordination of OH—Si—(OAl)$_3$. Consequently, an imogolite and a protoimogolite have roughly the same adsorption behavior at a relative humidity of 20% or less even regarding water vapor adsorption properties. Although the protoimogolite does not grow to a relatively long tube shape as with a crystalline imogolite, it is considered to accordingly possess the imogolite structure. Accordingly, a protoimogolite possesses a similar adsorbent property as with an imogolite in a low-humidity range. The Si/Al molar ratio upon synthesis of both the imogolite and the protoimogolite is 0.35 to 0.55.

In addition, if the Si/Al ratio is set to 0.7 to 1.0 during the synthesis and synthesized material is heated at 150° C. for 2 days after being subject to desalination treatment, a complex of an amorphous substance and low-crystallinity clay is to be formed. Since this complex is a complex of hydrous amorphous aluminum silicate and clay, it is hereinafter referred to as the "HAS clay" based on a complex of HAS (Hydroxyl-Aluminum Silicate) and clay. Moreover, if the Si/Al ratio is set to 0.7 to 1.0 during the synthesis and imogolite or protoimogolite is heated at 100° C. for 2 days after being subject to desalination treatment, the obtained substance also yields extremely superior adsorption performance of water vapor and carbon dioxide. Since this substance becomes a complex of hydrous amorphous aluminum silicate and clay if it is heated at 100° C. for 30 days or more, it is hereinafter referred to as the "HAS clay precursor" (refer to Patent Documents 1 and 2).

The foregoing unique shape and physical properties of an imogolite as the nano-sized tubular aluminum silicate, a protoimogolite as its precursor, HAS clay and HAS clay precursor are considered to be industrially useful. In other words, since an imogolite, a protoimogolite as its precursor, HAS clay and HAS clay precursor are characterized in being able to adsorb various substances based on their unique microstructure; for instance, their availability as a hazardous contaminant adsorbent, a deodorant, a storage material for gas such as carbon dioxide and methane, and the like has been conventionally mentioned. In addition, since these yield superior water vapor adsorption performance, their application as a heat exchange material for heat pump, a dew condensation protectant, an autonomous humidity control material and the like is also expected.

In particular, since desiccant air conditioning aims to eliminate the moisture content in the air that is introduced from the outside air; it is required to efficiently eliminate the moisture content even from the high humidity air in the summer, and the adsorbent that is sought in the desiccant air conditioning is generally demanded of a high adsorption amount at a relative humidity of roughly 5% to 60%.

Under the foregoing circumstances, there are demands for industrially synthesizing an absorbent in large quantities at a low cost while maintaining the foregoing properties of the tubular aluminum silicate and HAS clay, and adsorbents utilizing the unique pores of the imogolite, amorphous imogolite and protoimogolite, and even the HAS clay and HAS clay precursor have been developed.

Nevertheless, according to the conventional production methods, it was necessary to use a mono-silicate aqueous solution as the starting material in order to produce large amounts of the imogolite and amorphous imogolite since the imogolite does not contain the polymer of Si. Moreover, aluminum sulfate was never used as the starting material of the aluminum source since the Keggin-type polymer of aluminum tridecamer blocks production of imogolite (refer to Patent Documents 3, 4 and 5).

Patent Document 1: Japanese Patent Application No. 2007-336403
Patent Document 2: Japanese Laid-Open Patent Publication No. 2008-103658
Patent Document 3: Japanese Laid-Open Patent Publication No. 2001-064010
Patent Document 4: Japanese Laid-Open Patent Publication No. 2004-059330
Patent Document 5: Japanese Laid-Open Patent Publication No. 2008-179533

DISCLOSURE OF THE INVENTION

The present invention was devised in view of the foregoing circumstances. Thus, an object of this invention is to provide a method of producing an amorphous aluminum silicate with superior water vapor adsorption performance and superior carbon dioxide adsorption performance in a medium-humidity range which can be synthesized at a lower cost than conventional methods, and an adsorbent with superior adsorption properties, particularly an adsorbent for desiccant air conditioning.

As a result of intense study in order to achieve the foregoing object, the present inventors succeeded in developing a high-performance water vapor adsorbent from liquid glass and aluminum sulfate, which could not have been synthesized based on the conventional technology of synthesis in high concentration of imogolite or amorphous imogolite or HAS clay or HAS clay precursor, and thereby achieved this invention.

Specifically, in order to achieve the foregoing object, the present invention provides:

[1] A method of producing an amorphous aluminum silicate, wherein liquid glass and an aqueous solution of aluminum sulfate are mixed to achieve a Si/Al molar ratio of 0.70 to 1.0, acid or alkali is added thereto to achieve a pH of 6 to 9, and the solution is thereafter heated at 110° C. or lower, and subsequently subject to desalination treatment.

[2] An amorphous aluminum silicate, the amorphous aluminum silicate produced with the method according to [1] above, wherein the peaks in a $^{29}$Si solid state NMR spectrum are in the vicinity of −78 ppm, −87 ppm, and −92 ppm.

[3] An amorphous aluminum silicate, the amorphous aluminum silicate produced with the method according to [1] above, wherein the peaks in a pore size distribution curve are in two ranges of 2 to 4 nm and 30 to 80 nm.

[4] An adsorbent comprising the amorphous aluminum silicate according to [2] or [3] above as an active component.

[5] An adsorbent for desiccant air conditioning comprising the amorphous aluminum silicate according to [2] or [3] above as an active component.

EFFECT OF THE INVENTION

The present invention is able to inexpensively provide an amorphous aluminum silicate with superior adsorption behavior in a medium-humidity range by using liquid glass and aluminum sulfate as the reagent, and realize the production of an amorphous aluminum silicate at a higher concentration in comparison to the conventional production methods by using liquid glass as the reagent. Moreover, the amorphous aluminum silicate obtained with the method of the present invention yields superior water vapor adsorption performance, and, in particular, it is possible to provide an adsorbent for desiccant air conditioning with superior performance.

BRIEF DESCRIPTION OF THE DRAWINGS

FIG. 1 is a diagram showing the powder X-ray diffraction pattern of Example 1.
FIG. 2 is a photograph showing the observation result of Example 1 with the transmission electron microscope.
FIG. 3 is a diagram showing the results of the particle size analysis of Example 1 based on the small angle scattering.
FIG. 4 is a diagram showing the NMR spectrum of Example 1 and the Comparative Example.

BEST MODE FOR CARRYING OUT THE INVENTION

Figure 5:
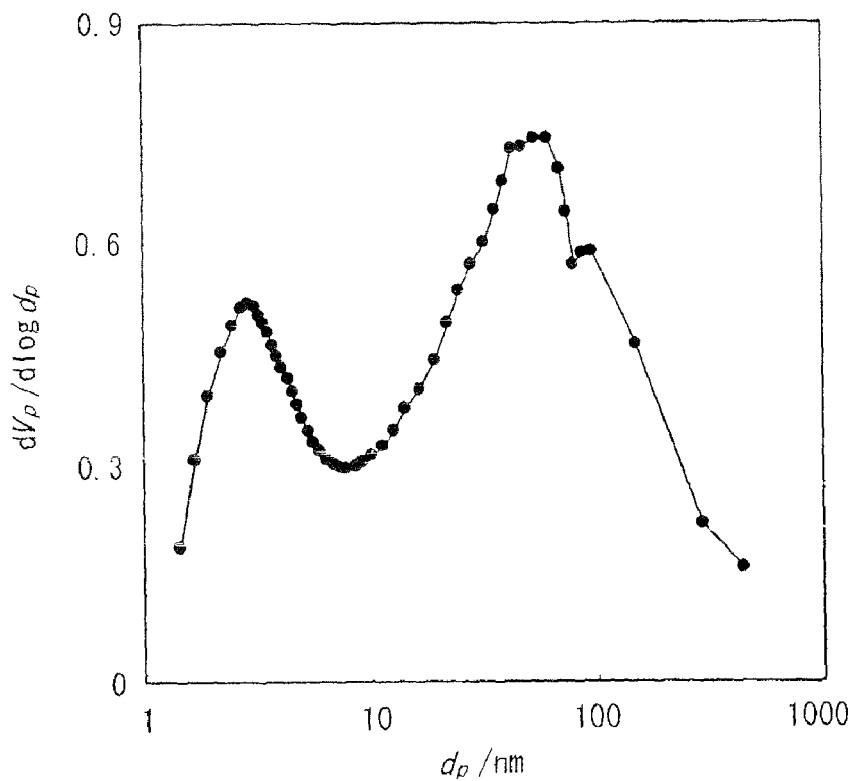
FIG. 5 is a diagram showing the pore diameter distribution curve based on the nitrogen adsorption of Example 1.

The present invention is now explained in further detail.

An amorphous aluminum silicate is a hydrated aluminum silicate which has silicon (Si), aluminum (Al), oxygen (O) and hydrogen (H) as its primary constituent elements, and is assembled by numerous Si—O—Al bonds.

The present invention produces this amorphous aluminum silicate by mixing liquid glass and an aqueous solution of aluminum sulfate, polymerizing the silicon and aluminum, performing heat treatment and maturation thereto, and thereafter subjecting the solution to desalination treatment.

With the present invention, not only does the amorphous aluminum silicate obtained with the synthesis need to yield a performance of adsorbing water vapor of 20 wt % or more in a relative humidity of 5 to 60%, it also needs to be synthesized from an inexpensive reagent unlike the imogolite and amorphous imogolite as the conventionally known tubular aluminum silicate, and unlike the HAS clay and HAS clay precursor.

Specifically, as a result of intense study, the present inventors discovered that an amorphous aluminum silicate in high concentration can be produced inexpensively by shifting the reagents, which are to become the Si source and the Al source in the conventional synthesis of imogolite or protoimogolite as well as HAS clay and HAS clay precursor, from sodium orthosilicate as a mono-silicate to liquid glass with respect to the Si source, and from aluminum chloride to aluminum sulfate with respect to the Al source. By mixing the starting solutions made of the foregoing reagents, adding acid or alkali to the mixed solution to achieve a pH of 6 to 9, heating the mixed solution and thereafter performing desalination treatment thereto, an amorphous aluminum silicate capable of providing a substance with superior moisture absorption behavior in a relative humidity of 5 to 60% can be obtained.

In order to mix the liquid glass and the aqueous solution of aluminum sulfate to be within the foregoing predetermined range, glass is diluted in pure water, and aluminum sulfate is dissolved in pure water so as to respectively prepare the solution in the prescribed concentrations. In order to yield superior adsorption behavior in a relative humidity of 60%, the mixture should be performed to achieve a silicon/aluminum molar ratio of 0.70 to 1.0. Although the concentration of silicon in the liquid glass is 1 to 2000 mmol/L and the concentration of aluminum in the aqueous solution of aluminum sulfate is 1 to 2000 mmol/L, as a preferred concentration, it is desirable to mix a silicon compound solution of 1 to 700 mmol/L and an aluminum compound solution of 1 to 1000 mmol/L. Based on the foregoing ratios and concentrations, the aqueous solution of aluminum sulfate is mixed into the solution of liquid glass, the pH is adjusted to 6 to 9 with acid or alkali, the solution is heated at 90 to 110° C., the product is thereafter subject to desalination treatment (cleansing) so as to eliminate the coexisting ions in the solution, and the dried solid is the intended amorphous aluminum silicate of the present invention.

EXAMPLES

The present invention is now specifically explained based on the Examples and Comparative Examples, but the present invention shall not be limited in any way by the following Examples.

Example 1

2000 mL of a solution of liquid glass diluted with pure water was prepared to achieve a Si concentration of 0.8 mol/

L. Moreover, 2000 mL of an aqueous solution of aluminum sulfate with an Al concentration of 0.94 mol/L was prepared by dissolving aluminum sulfate in pure water. Subsequently, the aqueous solution of aluminum sulfate was mixed with the solution of liquid glass and it was stirred with an agitator. The silicon/aluminum molar ratio at this time was 0.85. Further, 600 mL of an aqueous solution of 5N sodium hydroxide was added to this mixed solution to achieve a pH of 7. After stirring this solution for 30 minutes at room temperature, it was poured into a hermetic container of 5 L, and it was heated in a constant-temperature bath at 95° C. for 1 day. An aqueous solution containing amorphous aluminum silicate was thereby obtained. After cooling the aqueous solution, it was cleansed 4 times by centrifugation and thereafter dried at 60° C.

Comparative Example

As the Comparative Example, the substance described in foregoing Patent Document 5 (Japanese Laid-Open Patent Publication No. 2008-179533) was synthesized in accordance with the production method of the present invention as follows.

2000 mL of an aqueous solution of sodium orthosilicate diluted with pure water was prepared to achieve a Si concentration of 0.4 mol/L. Moreover, 2000 mL of an aqueous solution of aluminum sulfate with an Al concentration of 0.47 mol/L was prepared by dissolving aluminum chloride in pure water. Subsequently, the aqueous solution of sodium orthosilicate was mixed with the aqueous solution of aluminum chloride and it was stirred with an agitator. The silicon/aluminum molar ratio at this time was 0.85. Further, 20 mL of an aqueous solution of 5N sodium hydroxide was added to this mixed solution to achieve a pH of 7. After stirring this solution for 30 minutes at room temperature, it was poured into a hermetic container of 5 L, and it was heated in a constant-temperature bath at 95° C. for 1 day. An aqueous solution containing amorphous aluminum silicate was thereby obtained. After cooling the aqueous solution, it was cleansed 4 times by centrifugation and thereafter dried at 60° C.

The aqueous solution containing the amorphous aluminum silicate obtained after the heating in Example 1 was filtered, and the filtrate was subject to ICP emission spectrometric analysis on Si and Al. Consequently, the silicon/aluminum molar ratio in the filtrate was 0.85. Based on the foregoing result, it was assumed that the silicon/aluminum molar ratio on the solid phase side is 0.85.

Moreover, as a result of performing fluorescent X-ray analysis to the product of Example 1, 2.0 wt % of sodium and 1.9 wt % of sulfuric acid were contained in addition to silicon and aluminum.

The product obtained in Example 1 was subject to substance identification based on powder X-ray diffraction and measurement concerning the particle diameter based on the X-ray small angle scattering technique.

FIG. 1 shows the powder X-ray diffraction pattern of the product obtained in Example 1. As shown in FIG. 1, broad peaks can be seen in the vicinity of 2θ=27° and 40°, and peaks that are characteristic to the amorphous aluminum silicate were observed.

Consequently, it was confirmed that the substance of Example 1 is an amorphous substance.

FIG. 2 is a photograph showing the observation result of the product obtained in Example 1 with a transmission electron microscope. As shown in FIG. 2, two types of particles were observes; specifically, ring-shaped particles with a size of 2 to 3 nm, and randomly-shaped particles with a size of 2 to 10 nm.

FIG. 3 shows the results upon analyzing the peak data obtained with the X-ray small angle scattering technique from the product obtained in Example 1 by using the NANO-Solver software manufactured by Rigaku Corporation. Consequently, it was confirmed that the substance obtained in Example 1 is a substance having peaks in the vicinity of 2.5 nm and 15 nm in a particle size distribution.

The ring-shaped particles with a size of 2 to 3 nm observed with the transmission electron microscope corresponds to the particle size of 2.5 nm obtained with the X-ray small angle scattering technique. Meanwhile, with respect to the randomly-shaped particles with a size of 2 to 10 nm observed with the electron microscope, it is assumed that clear peaks did not appear with the X-ray small angle scattering technique since the shapes were random and the sizes were different. Moreover, the peak of particle size distribution in the vicinity of 15 nm obtained with the X-ray small angle scattering technique is assumed to be the size of the secondary particles resulting from the aggregation of the ring-shaped particles with a size of 2 to 3 nm and the randomly-shaped particles with a size of 2 to 10 nm.

FIG. 4 shows the spectrum of the product obtained in Example 1 and the product obtained in the Comparative Example based on the $^{29}$Si solid state NMR and the $^{27}$Al solid state NMR.

In the $^{29}$Si solid state NMR, the peaks were observed in the vicinity of −78 ppm and −87 ppm with the substance obtained in the Comparative Example, but with the substance obtained in Example 1, in addition to the peaks of −78 ppm and −87 ppm, a peak was observed in the vicinity of −92 ppm.

In the $^{27}$Al solid state NMR, with both Example 1 and the Comparative Example, peaks were observed at 0 ppm deriving from hexacoordination and in the vicinity of 53 ppm deriving from tetracoordination.

Upon seeking the specific surface area from the adsorption measurement results of nitrogen gas regarding the product obtained in Example 1, the BET specific surface area was 520 $m^2$/g. Moreover, the outer specific surface area based on t-plot analysis was 272 $m^2$/g, and the inner specific surface area of pore was 244 $m^2$/g. In addition, as shown in FIG. 5, a pore diameter distribution curve based on the BJH method has two top peaks at 2.9 nm and 54 nm.

Example 2

In this Example, the obtained product was evaluated upon changing the conditions of the range of the Si/Al molar ratio to be 0.6 to 1.1 in the method of producing the amorphous aluminum silicate of Example 1.

The evaluation of the product was performed with the evaluation test of water vapor adsorption. This evaluation method is that approximately 0.3 g of a sample is placed in a weighing bottle, the weight after drying at 100° C. for 1 hour is referred to as the dry weight, it is placed in a constant temperature and humidity bath of 25° C. and a relative humidity of 60% for 1 hour to adsorb water vapor, and the water vapor adsorption ratio is obtained from the adsorbed amount.

Figure 6:
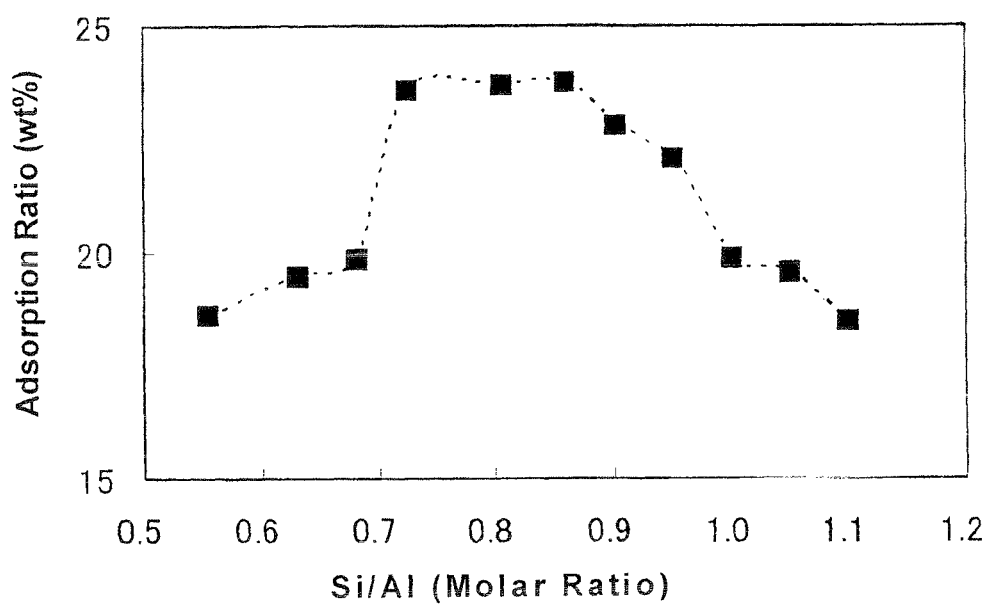
FIG. 6 is a diagram showing the relationship of the Si/Al molar ratio and the water vapor adsorption performance in Example 2

The results of Example 2 are shown in FIG. 6. As shown in FIG. 6, the obtained product yielded high water vapor adsorption performance in a Si/Al molar ratio of 0.70 to 1.0, preferably 0.70 to 0.95

Example 3

In this Example, the obtained product was evaluated upon changing the conditions of the pH after the addition of the aqueous solution of sodium hydroxide to be a pH of 4 to 10 in the method of producing the amorphous aluminum silicate of Example 1. The evaluation of the product was performed as with Example 2.

Figure 7:
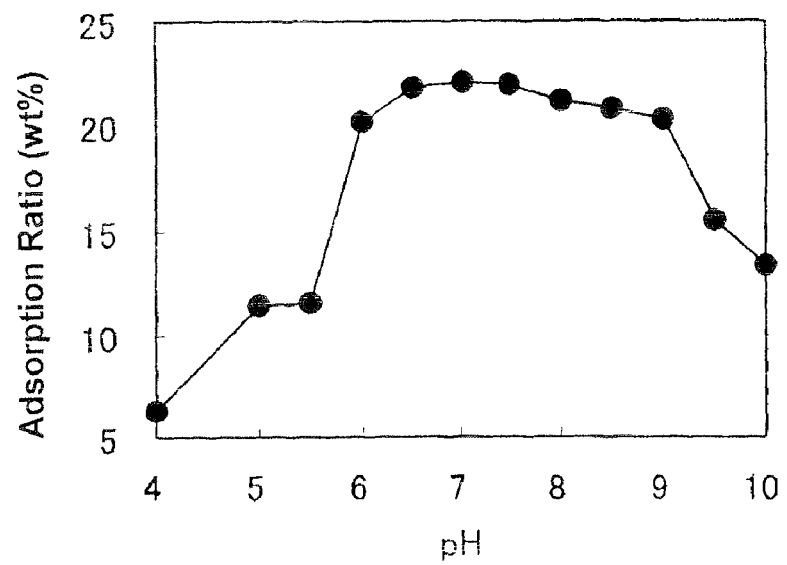
FIG. 7 is a diagram showing the relationship of the pH and the water vapor adsorption performance after dripping the aqueous solution of sodium hydroxide in Example 3.

The results of Example 3 are shown in FIG. 7. As shown in FIG. 7, the obtained product yielded high water vapor adsorption performance in a range where the pH after adding the aqueous solution of sodium hydroxide was 6 to 9.

Example 4

In this Example, an aqueous solution of potassium hydroxide was used in substitute for the aqueous solution of sodium hydroxide to perform the synthesis in the method of producing the amorphous aluminum silicate of Example 1. Consequently, the obtained product yielded a water vapor adsorption performance that was comparable with Example 1.

INDUSTRIAL APPLICABILITY

The present invention relates to a method of producing an amorphous aluminum silicate with high-performance adsorption properties in a medium-humidity range, and the amorphous aluminum silicate obtained with the method of the present invention is effective as an autonomous humidity conditioning agent, a dehumidifying agent for desiccant air conditioning, a hazardous contaminant adsorbent, a deodorant, and a storage material for gas such as carbon dioxide and methane. In addition, with the present invention enables to synthesize an amorphous substance with the foregoing properties in large amounts and with low cost.

The invention claimed is:

1. A method of producing an amorphous aluminum silicate, wherein liquid glass and an aqueous solution of aluminum sulfate are mixed to achieve a Si/Al molar ratio of 0.70 to 1.0, acid or alkali is added thereto to achieve a pH of 6 to 9, and the solution is thereafter heated at 110° C. or lower, and subsequently subject to desalination treatment.

2. An amorphous, aluminum silicate, the amorphous aluminum silicate produced with the method according to claim 1, wherein the amorphous aluminum silicate has peaks in a $^{29}$Si solid state NMR spectrum are in the vicinity of −78 ppm, −87 ppm, and −92 ppm.

3. An amorphous aluminum silicate, the amorphous aluminum silicate produced with the method according to claim 1, wherein the amorphous aluminum silicate has peaks in a pore size distribution curve are in two ranges of 2 to 4 nm and 30 to 80 nm.

4. An adsorbent comprising the amorphous aluminum silicate according to claim 2 or claim 3 as an active component.

5. An adsorbent for desiccant air conditioning comprising the amorphous aluminum silicate according to claim 2 or claim 3 as an active component.

6. The amorphous aluminum silicate according to claim 2, wherein the amorphous aluminum silicate has peaks in a pore size distribution curve in two ranges including 2 to 4 nm; and 30 to 80 nm.

7. The amorphous aluminum silicate according to claim 2, wherein the Si/Al molar ratio of the amorphous aluminum silicate is 0.70 to 0.95.

8. The amorphous aluminum silicate according to claim 3, wherein the Si/Al molar ratio of the amorphous aluminum silicate is 0.70 to 0.95.

* * * * *

UNITED STATES PATENT AND TRADEMARK OFFICE
CERTIFICATE OF CORRECTION

| | |
|---|---|
| PATENT NO. | : 8,202,360 B2 |
| APPLICATION NO. | : 13/060384 |
| DATED | : June 19, 2012 |
| INVENTOR(S) | : Masaya Suzuki et al. |

It is certified that error appears in the above-identified patent and that said Letters Patent is hereby corrected as shown below:

Column 8, line 11 "spectrum are in" should read "spectrum in".

Column 8, line 16 "curve are in" should read "curve in".

Signed and Sealed this
Thirtieth Day of October, 2012

David J. Kappos
*Director of the United States Patent and Trademark Office*